(No Model.)

J. CLINGMAN.
MEAT AND VEGETABLE PRESERVING CHEST.

No. 257,211. Patented May 2, 1882.

WITNESSES:
Gus. A. Meyer
Thos. McGowan

INVENTOR
John Clingman
BY Stem & Beck
his ATTORNEYS

N. PETERS, Photo-Lithographer, Washington, D. C.

UNITED STATES PATENT OFFICE.

JOHN CLINGMAN, OF DAYTON, OHIO.

MEAT AND VEGETABLE PRESERVING CHEST.

SPECIFICATION forming part of Letters Patent No. 257,211, dated May 2, 1882.

Application filed February 13, 1882. (No model.)

*To all whom it may concern:*

Be it known that I, JOHN CLINGMAN, a citizen of the United States, residing at Dayton, Montgomery county, Ohio, have invented certain new and useful Improvements in Meat and Vegetable Preserving Chests, of which the following is a full, clear, and exact description.

My invention relates to an improvement in meat and vegetable preserving chests.

It has for its object the preservation in hot weather of meat and vegetables for a reasonable period of time without the use of ice. I take advantage of the well-known fact that by placing meat or vegetables in an air-exhausted chamber oxidation and decay are arrested and prevented for a much greater period of time than where the air has free access to them. To this end I construct a telescopic chest, the lid of which is sealed by water or other liquid contained in a chamber formed between the inner and outer walls, into which chamber the downward-extending sides of the top fit and slide. Also, connected with this preserving-chamber is a second smaller chamber with a similarly-sealed top, the two chambers being connected by an air passage or vent controlled by an automatic valve, and in the tops of both chambers are similar valves, the arrangement being such that the smaller chamber, by having its lid or top successively raised and lowered, forms an air-pump, by means of which, after the meat and other articles to be preserved are placed in the larger chamber, the air is exhausted therefrom.

The novelty consists in the construction and combination of the parts, as will be herewith set forth and specifically claimed.

Figure 1:
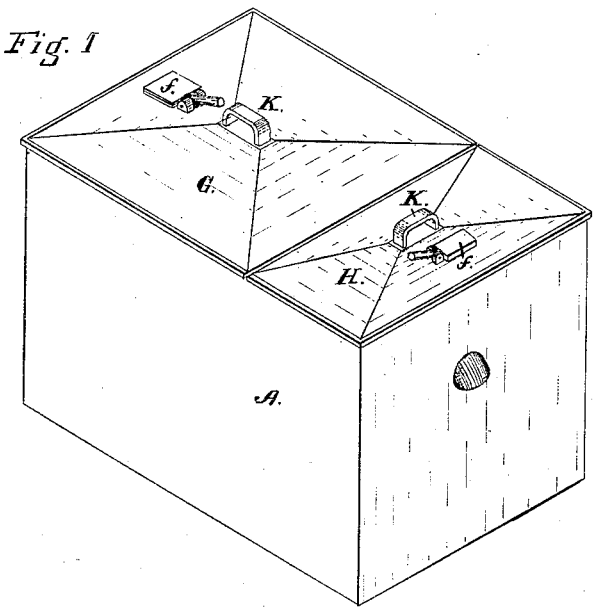
Figure 2:
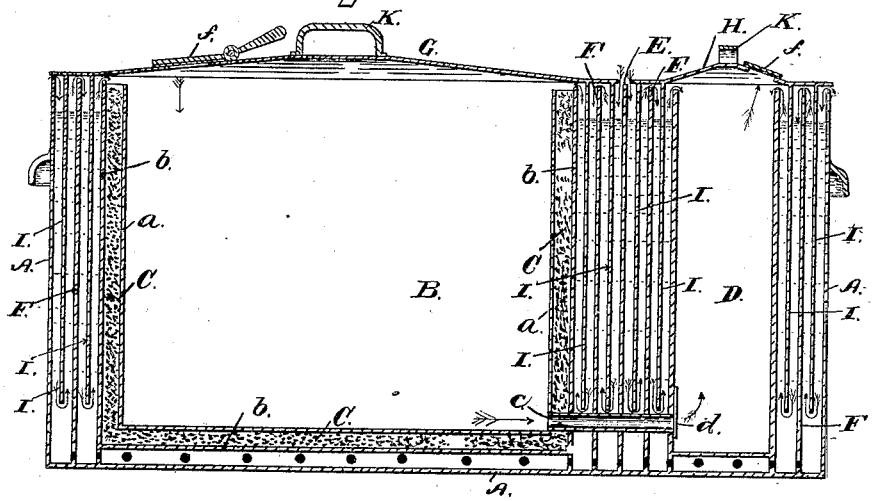

In the accompanying drawings, Figure 1 is a perspective view of my improved preserving-chest. Fig. 2 is a longitudinal central sectional view, in elevation, of the same.

I provide any suitable oblong or other shaped box or chest, A, of wood or metal, and of a size to suit its intended requirements. Into this box, at one end, is secured the preserving-chamber B, with a space left between its bottom and sides and the sides and bottom of the outer box, A. This chamber has outer walls, the inner of which is perforated and the space between filled with charcoal or other antiseptic non-conducting material, as seen at C, *a* being the inner perforated wall, and *b* the outer solid wall. If desired, any suitable shelves may be placed in the chamber B, whereon to set the articles to be preserved. In the outer end of the box A is a second smaller chamber, D, with space between its bottom and sides and those of the box A. A division-wall, E, separates these two chambers, as shown, and communication is had between them through a connecting-tube or vent, *c*, arranged at or near the bottom of both chambers and having a valve, *d*, opening toward or into the chamber D.

F F F F are additional vertical division-walls between the sides of the box and the chambers and between the chambers themselves, as shown. The tops G and H of both chambers have double pendent sides I, which enter the spaces formed by the sides of the box and the division-walls and reach nearly to the bottom of the box, as clearly shown. Each top is provided with a suitable handle, K, and each is provided with automatic spring-valves *f*, of any suitable construction, opening outward. The spaces between the chambers and the outer box are filled with water or other innocuous liquid, thus rendering the chamber air-tight when the lids are applied. To use this simple device the lid G of the preserving-chamber is removed, and the articles to be preserved are introduced and the lid then replaced. By now raising the lid H of the chamber D the air is drawn out of the preserving-chamber through the vent *c* and into the chamber D, and upon pressing down the lid the air cannot return to the chamber B by reason of the valve *d*, but escapes through the valve *f* in the top of the lid. By repeating this pumping motion of the lid H the air is entirely (at least to a practical extent) exhausted from the chamber B, and remains so until it is desired to remove any of the articles. When this is desirable it is only necessary to open the valve *f* in the lid G, permitting the air to enter chamber B, when the lid can be removed. When it is replaced the same pumping operation is repeated to exhaust the air again. I prefer to make a pump of the chamber D and its lid; but, if desired, this chamber may be dispensed with and any suitable air-pump be substituted therefor.

Having thus fully described my invention, I claim—

1. A preserving-chest for meat, vegetables, and the like, composed of an outer box and an inner preserving-chamber, with space between the two filled with water or other liquid, and having a lid or cover with slides entering the water-space, in combination with an air-exhausting pump and an inflowing-air valve, substantially as described.

2. The herein-described meat and vegetable preserving chest, composed of the outer box, A, preserving-chamber B, with non-conducting walls, supplemental chamber D, division-walls E and F, lids G and H, with pendent sides I, vent $c$, and valves $d$ and $f$, the whole constructed and arranged in the manner and for the purpose specified.

JOHN CLINGMAN.

Witnesses:
FRANK SCHIEBLE,
E. H. KERR.